(12) United States Patent
Seima et al.

(10) Patent No.: US 6,873,125 B2
(45) Date of Patent: Mar. 29, 2005

(54) MOTOR DRIVING APPARATUS AND MOTOR USING THE SAME

(75) Inventors: Toshiaki Seima, Tottori (JP); Tomoharu Yokouchi, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 70 days.

(21) Appl. No.: 10/446,376

(22) Filed: May 28, 2003

(65) Prior Publication Data
US 2004/0012353 A1 Jan. 22, 2004

(30) Foreign Application Priority Data

May 31, 2002 (JP) ........................................ 2002-159234

(51) Int. Cl.[7] .............................. H02P 6/18; H02P 6/20
(52) U.S. Cl. ...................... 318/254; 318/431; 318/437
(58) Field of Search ................................ 318/811, 806, 318/819, 599, 696, 254, 138, 439, 705, 721–724, 716, 807, 798–802, 432, 434; 388/811, 812, 814, 815, 820, 822; 363/81, 84

(56) References Cited

U.S. PATENT DOCUMENTS

| 4,602,201 | A | * | 7/1986 | Edwards | 318/811 |
|---|---|---|---|---|---|
| 4,900,992 | A | * | 2/1990 | Sekizawa et al. | 318/135 |
| 5,309,078 | A | * | 5/1994 | Cameron | 318/811 |
| 5,780,983 | A | * | 7/1998 | Shinkawa et al. | 318/254 |
| 5,834,911 | A | * | 11/1998 | Kimura | 318/254 |
| 5,869,944 | A | * | 2/1999 | Tanina | 318/599 |
| 5,880,574 | A | * | 3/1999 | Otsuka et al. | 318/811 |
| 5,929,577 | A | * | 7/1999 | Neidorff et al. | 318/254 |
| 5,969,498 | A | * | 10/1999 | Cooke | 318/799 |
| 6,034,494 | A | * | 3/2000 | Kitamine et al. | 318/254 |
| 6,424,798 | B1 | * | 7/2002 | Kitamine | 388/800 |
| 6,512,343 | B1 | * | 1/2003 | Yasohara | 318/437 |
| 6,650,072 | B2 | * | 11/2003 | Harlan | 318/254 |
| 2004/0007998 | A1 | * | 1/2004 | Yasohara et al. | 318/437 |

FOREIGN PATENT DOCUMENTS

| JP | 5-38184 | 2/1993 |
|---|---|---|
| JP | 5-211780 | 8/1993 |
| JP | 6-141587 | 5/1994 |

* cited by examiner

Primary Examiner—David Martin
Assistant Examiner—Eduardo Colon Santana
(74) Attorney, Agent, or Firm—RatnerPrestia

(57) ABSTRACT

A motor driving apparatus includes a pulse-width modulator and a PWM frequency switch for switching a carrier frequency of the modulator. The PWM frequency switch changes a carrier frequency in a start-up period of the motor to another frequency when the motor enters into a regular rotation. The carrier frequency in the start-up period is set at a lower level than that in the regular rotation period, so that the driving apparatus can reduce power-loss generated in the start-up period by switching actions of respective driving elements forming a first and a second drivers. In the regular rotation period, the driving apparatus performs PWM-driving with a high enough carrier frequency, so that the motor driven by this driving apparatus can realize accurate rotation.

8 Claims, 13 Drawing Sheets

MOTOR DRIVING APPARATUS AND MOTOR USING THE SAME

FIELD OF THE INVENTION

The present invention relates to a motor driving apparatus using a pulse-width modulation (hereinafter referred to as PWM) driving method, which is used, e.g., in the field of information devices.

BACKGROUND OF THE INVENTION

A conventional PWM motor driving apparatus disclosed in Japanese Patent Application Non-examined Publication No. H05-38184 is known as realizing low power consumption of a brush-less motor (hereinafter simply referred to as a motor). FIG. 12 shows a structure of a conventional motor driving apparatus. In FIG. 12, position detecting element 1500 uses, e.g., Hall elements. Each one of those position detecting elements 1500 detects a position of respective rotor magnets (not shown) of the motor, and outputs a detection signal to conductive state instructing-circuit 1300 via position detecting circuit 1400. Instructing circuit 1300 outputs timing signals UHo, VHo, WHo, UL, VL, and WL in order to switch driving coils 1, 2 and 3.

Phase comparator 1204 compares a phase of frequency signal Fsp proportionate to a motor speed with a phase of reference frequency signal Fref. Phase comparator 1204 outputs phase-error signal PD, which indicates the phase difference between the foregoing two signals, to phase error amplifier 1202. Amplifier 1202 amplifies signal PD and outputs signal Vth to a non-inverting input terminal of PWM comparator 1201. An inverting input terminal of PWM comparator 1201 receives signal Vosc supplied from oscillator 1203. PWM comparator 1201 compares signal Vth with signal Vosc, and outputs signal Vd. AND gate 1101 receives signal Vd and the foregoing signal UHo, and outputs signal UH to the base of transistor 1009. AND gate 1102 receives signal Vd and signal VHo, and outputs signal VH to the base of transistor 1007. AND gate 1103 receives signal Vd and signal WHo, and outputs signal WH to the base of transistor 1005.

Signal UL is fed into the base of transistor 1021, signal VL is fed into the base of transistor 1020, and signal WL is fed into the base of transistor 1019.

The collector of transistor 1008, which forms a Darlington pair with transistor 1009, is connected to the collector of transistor 1021, and this junction point is connected to a first terminal of driving coil 1 of the motor. The collector of transistor 1006, which forms a Darlington pair with transistor 1007, is connected to the collector of transistor 1020, and this junction point is connected to a first terminal of driving coil 2 of the motor. The collector of transistor 1004, which forms a Darlington pair with transistor 1005, is connected to the collector of transistor 1019, and this junction point is connected to a first terminal of driving coil 3 of the motor. Between the emitter and the collector of transistor 1008, diode 1003 is connected. Between the emitter and the collector of transistor 1006, diode 1002 is connected. Between the emitter and the collector of transistor 1004, diode 1001 is connected. Between the collector and the emitter of transistor 1021, diode 1018 is connected. Between the collector and the emitter of transistor 1020, diode 1017 is connected. Between the collector and the emitter of transistor 1019, diode 1016 is connected. Respective second terminals of coils 1, 2 and 3 are connected with each other.

As discussed above, transistors 1009, 1008 and diode 1003, transistors 1007, 1006 and diode 1002, transistor 1005, 1004 and diode 1001 form an upper arm. Transistor 1021 and diode 1018, transistor 1020 and diode 1017, transistor 1019 and diode 1016 form a lower arm. Coils 1, 2 and 3 are connected between the upper arm and the lower arm.

The respective signals UHo, VHo, WHo, UL, VL and WL change their High and Low states responsive to positions of the rotor magnets, and conductive states of coils 1, 2 and 3 change sequentially, so that the motor rotates.

FIG. 13 illustrates an operation of the conventional driving apparatus shown in FIG. 12, and particularly shows the operation of obtaining signal Vd supplied from PWM comparator 1201. Phase comparator 1204 is formed of, e.g., flip-flops. As shown in FIG. 12, phase comparator 1204 uses respective rising edges of signal Fref and signal Fsp to set or reset comparator 1204 (flip-flops), and outputs signal PD. Phase-error amplifier 1202 provides signal PD with integrating amplification, and amplifies signal PD to a voltage level responsive to the duties of High/Low of signal PD, and outputs signal Vth. PWM comparator 1201 compares signal Vosc that is a carrier frequency signal of PWM driving with signal Vth, and outputs signal Vd having High/Low duties responsive to a voltage of signal Vth.

As shown in FIG. 13, when a phase difference between signal Fref and signal Fsp is large, a pulse width of signal PD becomes large (a period of High becomes longer), so that a voltage of signal Vth rises. As a result, a period of High of signal Vd increases, and an ON period of PWM driving increases, so that the motor is accelerated. On the contrary, when the phase difference between signal Fref and signal Fsp is small, a pulse width of signal PD becomes narrow (a period of High becomes shorter), and a voltage of signal Vth lowers. As a result, a period of Low of signal Vd increases, and an OFF period of PWM driving increases, so that the motor is decelerated. Signal Vd supplied from PWM comparator 1201 is logically synthesized with respective signals UHo, Vho and WHo supplied from conductive state instructing circuit 1300, so that the first conduction switch signals UH, VH and WH are obtained. In other words, the ON/OFF signal, i.e., high-level/low-level signal, having a duty proportionate to an output level from phase-error amplifier 1202 allows the group of transistors in the upper arm to perform chopping operations. As discussed above, the conventional driving apparatus shown in FIG. 12 makes the group of transistors in the upper arm perform the chopping operation, thereby controlling the rotation of the motor with a low power consumption.

In the foregoing conventional driving apparatus, when respective transistors in the upper arm are in the PWM operation, even during the OFF period of the PWM operation, the energy stored in respective coils is consumed as a regenerative current in flywheel diodes coupled in parallel with the respective transistors in the lower arm, i.e., the counterpart of the transistors in the upper arm. As a result, a lot of power is lost in the flywheel diodes. Meanwhile, a driving method, in which either one of the transistor-groups in the upper arm or the lower arm performs PWM chopping drive, is referred to as a single side PWM driving method.

A synchronous rectification PWM driving method is disclosed in Japanese Patent Application Non-examined Publication No. H05-211780. This method is proposed to overcome the foregoing problem, and turns on the transistor counterpart of a transistor which is turned off, namely, during an OFF period of PWM. This mechanism allows the energy stored in the driving coils to regenerate via the driving transistor having a smaller ON resistance than that of the flywheel diode, thereby reducing the power loss.

In general, a motor used in information devices requires a large amount of current in a start-up period for being ready to work in minimal time. This is a critical point to evaluate the performance of the motor. Therefore, several times of starting current is fed to the driving coils of a motor more than that of the regular rotating condition.

However, in the structure discussed above, a higher PWM frequency set for satisfying a rotational accuracy required to a motor also raises the PWM frequency to the higher one in the start-up period which does not require such a severe rotational accuracy. As a result, power loss (switching loss) generated at ON/OFF of the driving transistor increases, which entails heat generation in the elements thereby decreasing the reliability and yet increasing the power consumption.

In the synchronous rectification PWM driving, when a transistor in the upper arm and the counterpart transistor in the lower arm are turned on simultaneously, an undesirable flow-through current is generated in both the transistors. In order to prevent this flow-through current, there is a need to prepare an OFF period (dead zone) where a transistor in the upper arm and its counterpart transistor in the lower arm are simultaneously turned off. The dead zone is determined, in general, by not the PWM frequency but the switching characteristics of the transistors. For this purpose, a longer dead zone is set in addition to a higher PWM frequency set for increasing the rotational accuracy of the motor, then the dead zone takes a larger part with respect to the PWM duty, and the advantage of reducing the power loss is thus lowered. On the contrary, assuming that a priority is given to the reduction of power loss, and set the dead zone without any margin, then characteristics-dispersion of the transistors invites a shortage of the dead zone and generates the flow-through current. In order to overcome this problem about the dead zone, expensive switching elements having excellent switching characteristics are needed or a complicated circuit is needed for realizing an accurate dead zone. Therefore the cost increase must be admitted in any way.

In the synchronous rectification PWM driving, a change in the r.p.m. of a motor, a change in a load, or an instruction of reducing torque narrows the PWM duty, so that the regenerative current passing through the driving coils backflows to the power supply (hereinafter referred to as a negative current). On top of that, when the negative current flows, the power supply voltage increases depending on an impedance of the power supply, and this voltage rise sometimes causes inconvenience to the motor, the motor driving apparatus, and the device incorporating those components.

SUMMARY OF THE INVENTION

The present invention addresses the problems discussed above, and aims to provide a motor driving apparatus that reduces power loss in accelerating a motor, and drives the motor at a high PWM frequency in rotating the motor at a regular r.p.m., thereby achieving a high rotational accuracy. Further the present invention provides a sophisticated and reliable motor driving apparatus that can prevent a negative current generated when the motor is decelerated.

The motor driving apparatus of the present invention comprises the following elements:

(a) a first driver formed of a plurality of driving elements which are coupled to both a first power supply line and motor driving coils of a motor;

(b) a second driver formed of a plurality of driving elements which are coupled to both a second power supply line and the motor driving coils of the motor;

(c) position detectors for detecting respective positional relations between rotor magnets of the motor and the driving coils;

(d) a conduction switch for outputting a conduction switching signal to the driving coils based on a detection signal supplied from the position detectors;

(e) a torque instructor for outputting a torque instructing signal that regulates torque generated by the motor;

(f) a pulse-width modulator for outputting a frequency signal having a duty of a pulse width in response to the torque instructing signal;

(g) a PWM controller for controlling ON/OFF of the first and the second drivers in response to a signal supplied from the conduction switch and a signal supplied from the pulse-width modulator;

(h) a driving-state detector for detecting at least one of an acceleration mode, a deceleration mode or a regular rotation mode of the motor being driven; and (i) a PWM frequency switch for switching a carrier frequency of the pulse-width modulator based on an output signal from the driving state detector.

The carrier frequency in the starting state of the motor is set at a lower level than in the regular rotating state.

As discussed above, this driving apparatus is equipped with the PWM frequency switch that changes the carrier frequency of the pulse-width modulator of the accelerating period to/from that of the regular rotating period. The carrier frequency of the pulse-width modulator is set at a lower frequency in the accelerating period than in the regular rotating period. This preparation allows reducing the power loss due to PWM chopping (switching) in accelerating the motor, and driving the motor at a high enough PWM frequency in the regular rotating period, thereby achieving accurate rotation.

In addition to the foregoing structure, the PWM controller works in two ways: One is a synchronous rectification PWM mode that puts both of the first driver and the second driver into the PWM operation, the other is a single side PWM mode that puts either one of the first or the second driver into the PWM operation. At the starting up of the motor, the synchronous rectification PWM mode can be used.

In the motor acceleration including the start-up, the motor is driven in the synchronous rectification PWM mode, which is then switched to the single side PWM mode when the motor is decelerated or driven at a regular speed. This driving method allows further reducing the power loss, because the driving elements perform chopping at a lower PWM frequency in accelerating the motor, and on top of that, the synchronous rectification PWM mode is used. On the other hand, during the regular rotation of the motor, a higher rotational accuracy is obtainable due to a high enough PWM frequency.

Further, the synchronous rectification PWM mode is set not to be used at the timing when a change of an r.p.m. or a load of a motor feeds a braking current to the driving coils, thereby preventing the negative current from passing. As a result, various inconveniences possibly invited by the negative current can be avoided.

DETAILED DESCRIPTION OF PREFERRED EMBODIMENTS

Exemplary embodiments of the present invention are demonstrated hereinafter with reference to the accompanying drawings.

Exemplary Embodiment 1

Figure 1:
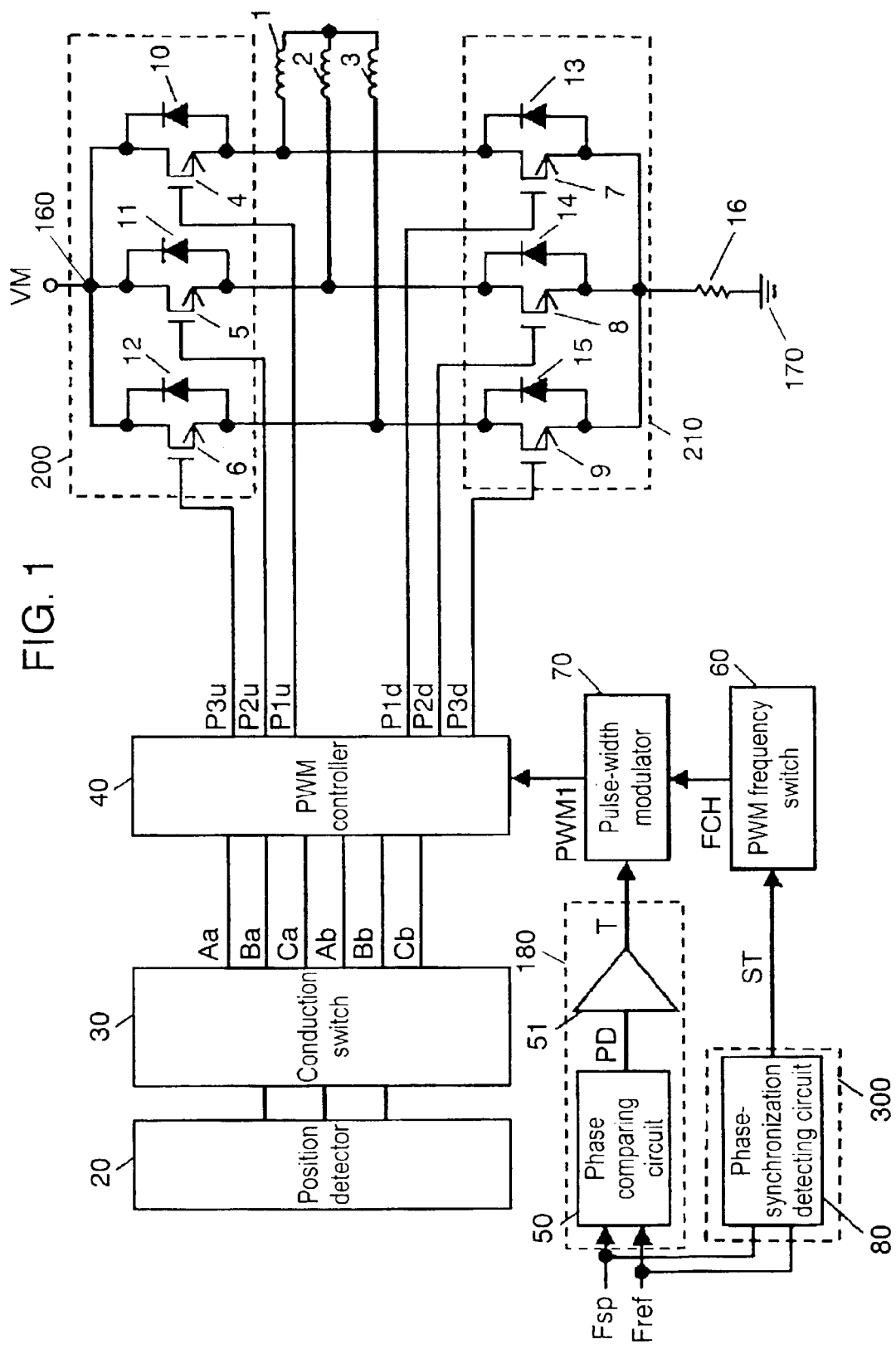
FIG. 1 shows a circuit diagram of a motor driving apparatus in accordance with a first exemplary embodiment of the present invention.
Figure 2:
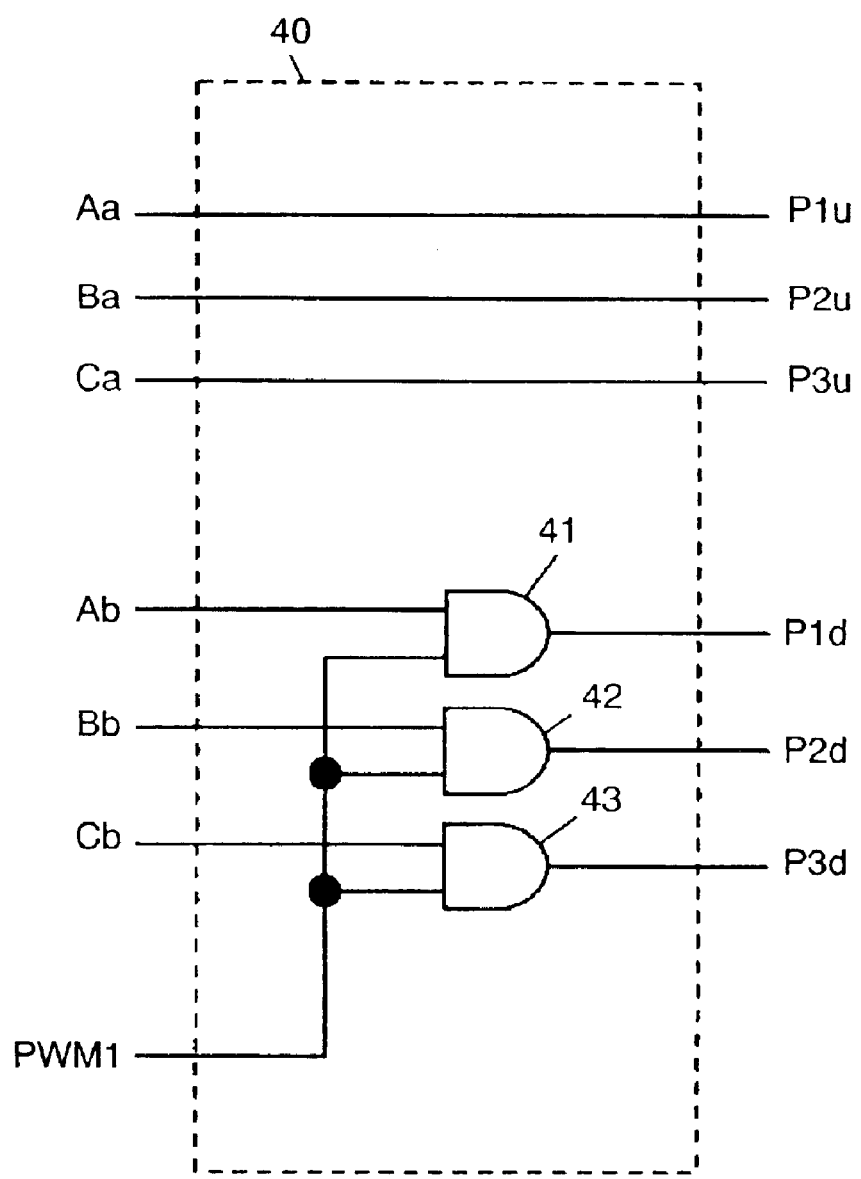
FIG. 2 shows a circuit diagram of a PWM controller in the motor driving apparatus shown in FIG. 1.
Figure 3A:
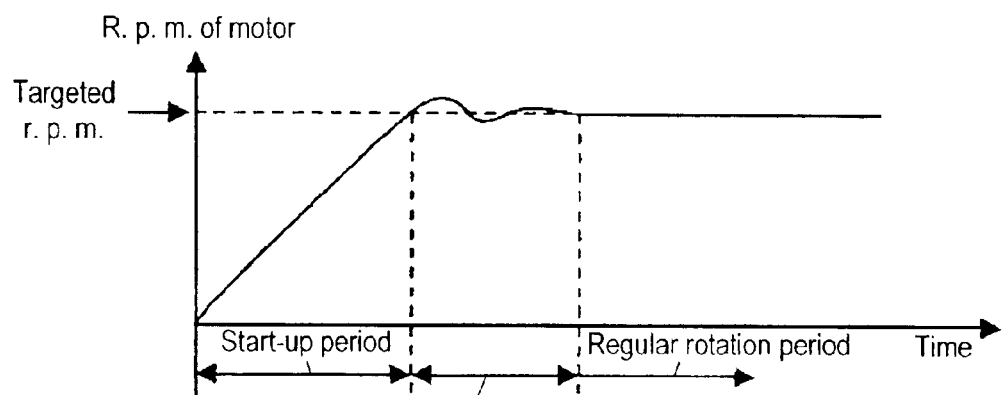
FIG. 3A through FIG. 3C illustrate an operation of the motor driving apparatus shown in FIG. 1.
Figure 3B:
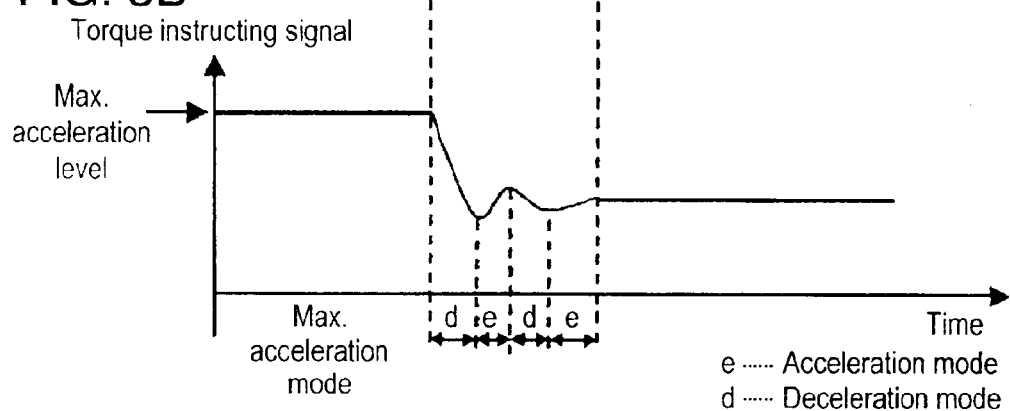
Figure 3C:
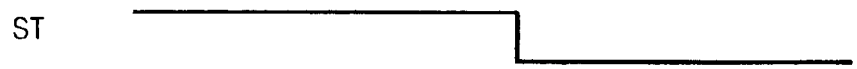
Figure 4A:
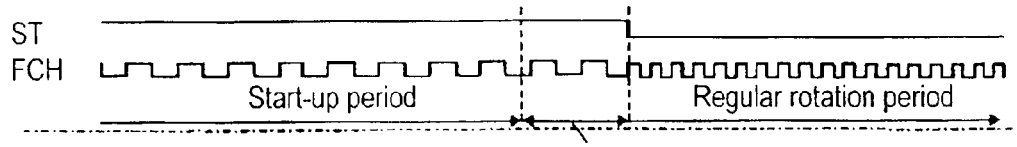
FIG. 4A through FIG. 4C show timing charts of signals of the motor driving apparatus shown in FIG. 1.
Figure 4B:
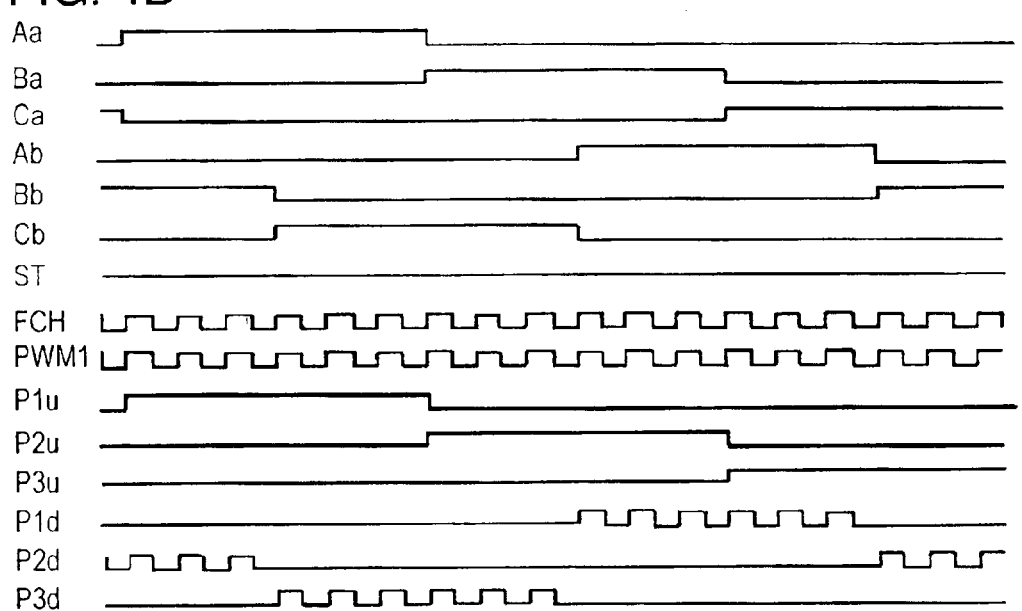
Figure 4C:
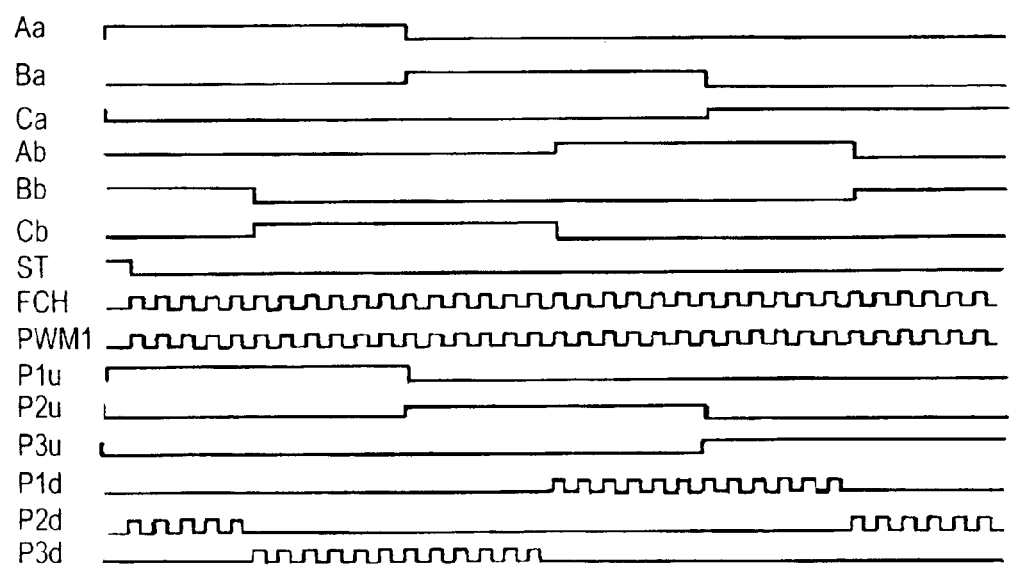
Figure 5A:
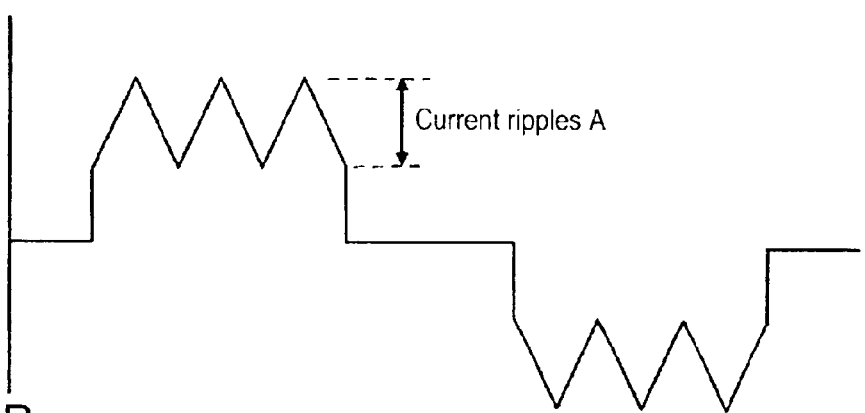
FIG. 5A and FIG. 5B show waveforms of driving coil currents of the motor driven by the driving apparatus shown in FIG. 1.
Figure 5B:
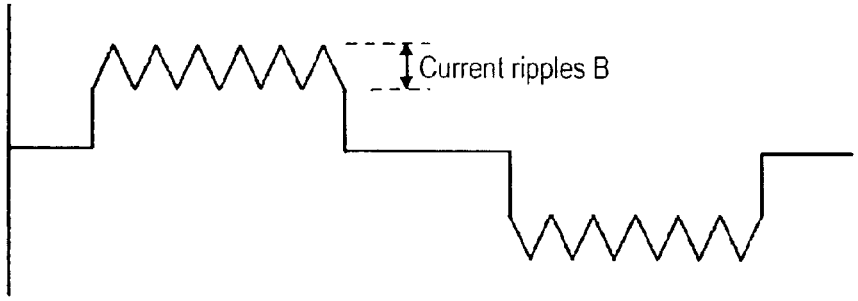

FIG. 1 shows a circuit diagram of a motor driving apparatus in accordance with the first exemplary embodiment of the present invention. FIG. 2 shows a circuit diagram of a PWM controller in the motor driving apparatus. FIG. 3A through FIG. 3C illustrate an operation of the motor driving apparatus. FIG. 4A through FIG. 4C show timing charts of signals of the motor driving apparatus. FIG. 5A and FIG. 5B show waveforms of driving coil currents of the motor driven by the driving apparatus.

In FIG. 1, a three-phase motor is taken as an example of a brush-less motor (hereinafter simply referred to as a motor) driven by the driving apparatus of the present invention. The three-phase motor includes driving coils 1, 2, and 3 which are wound on respective stator cores disposed opposite to rotor magnets (not shown) of the motor. Respective drains of driving transistors 4, 5 and 6 are coupled to first power source line 160 connected to power source terminal VM. A source of transistor 4 is connected to a first terminal of coil 1. A source of transistor 5 is connected to a first terminal of coil 2. A source of transistor 6 is connected to a first terminal of coil 3. Respective second terminals of coils 1, 2 and 3 are coupled to each other. Between the source and the drain of transistor 4, flywheel diode 10 is connected. Between the source and the drain of transistor 5, flywheel diode 11 is connected. Between the source and the drain of transistor 6, flywheel diode 12 is connected. Transistors 4–6 and diodes 10–12 form a first driver, namely, an upper arm.

On the other hand, respective sources of transistors 7, 8 and 9 are coupled to, via resistor 16, second power source line 170 that is connected to a grounding terminal. The drain of transistor 7 is connected to a first terminal of coil 1. The drain of transistor 8 is connected to a first terminal of coil 2. The drain of transistor 9 is connected to a first terminal of coil 3. Flywheel diode 13 is connected between the source and the drain of transistor 7. Flywheel diode 14 is connected between the source and the drain of transistor 8. Flywheel diode 15 is connected between the source and the drain of transistor 9. Transistors 7–9 and diodes 13–15 form a second driver, namely, a lower arm. Respective sources of transistors 7, 8 and 9 are coupled to the second power supply line 170 via resistor 16; however, they can be directly connected to line 170 without resistor 16. Resistor 16 is placed for detecting a current passing there, and it is not an essential constitutional element of the present invention.

Since transistors 4–6 form parts of first driver 200, they are called a first group of driving transistors. By the same token, transistors 7–9 are called a second group of driving transistors because they form parts of second driver 210.

Position detector 20 detects positions of the rotor magnets with respect to the driving coils based on, e.g., output signals from Hall elements, or back electromotive force induced by the driving coils of the motor. In the case of the three–phase motor shown in FIG. 1, position detector 20 uses, in general, three Hall elements. Conduction switch 30 receives respective position detection signals of the three phases from detector 20, and outputs phase-change signals of three-phase full-wave driving, i.e., signals Aa, Ba, Ca, Ab, Bb, and Cb, to PWM controller 40.

Phase comparing circuit 50 receives frequency signal Fsp in proportion to the r.p.m of the motor and reference frequency signal Fref that is used as a reference to the motor speed, then outputs signal PD to error-amplifying circuit 51. Signal PD shows a phase difference between signals Fsp and Fref. Error amplifying circuit 51 amplifies signal PD and converts it into torque instructing signal T before outputting it to pulse-width modulator 70. Phase comparing circuit 50 and error amplifying circuit 51 form torque instructor 180 of the present invention. Phase-synchronization detecting circuit 80 receives frequency signal Fsp and reference frequency signal Fref, then outputs signal ST to PWM frequency switch 60, which then supplies signal FCH to pulse-width modulator 70. Pulse-width modulator 70 outputs signal PWM1 in response to torque instructing signal T to PWM controller 40 at a PWM frequency determined by PWM frequency switch 60.

PWM controller 40 outputs six signals, i.e., signals P3u, P2u, P1u, P1d, P2d and P3d to respective gates of transistors 4–9 forming the first and the second drivers. A specific structure of PWM controller 40 can be the circuit shown in FIG. 2, where conduction switch 30 outputs signals Aa, Ba and Ca, and they are output as the output signals P1u, P2u and P3u of PWM controller 40 as they are. Output signals Ab, Bb and Cb from switch 30 are fed into respective first terminals of AND gates 41, 42 and 43. Pulse-width modulator 70 outputs signal PWM 1 to respective second terminals of AND gates 41, 42 and 43, which supply signals forming an output of PWM controller 40, and resulting in output signals P1d, P2d and P3d.

An operation of the motor driving apparatus having the structure discussed above is demonstrated hereinafter. FIG. 3A through FIG. 3C illustrate the operation of the motor driving apparatus shown in FIG. 1, and show a relation between the tracking of the r.p.m. of the motor from the starting state to the regular rotating state and the state of output signal ST supplied from driving-state detector 300.

FIG. 3A shows the tracking of the r.p.m. of the motor from the starting state to the regular rotating state. Between these two states, there exist three major periods, namely, a start-up period, a transitional period of speed-or phase-control, and a regular rotation period in which the motor rotates at a targeted r.p.m. constantly. FIG. 3B shows the tracking of torque instructing signal T of torque instructor 180 from the starting state to the regular rotating state of the motor. In the start-up period, signal T stays at the max. acceleration level for the motor to generate the max. torque. In the regular rotation period signal T stays typically at a constant voltage level. In the midway period, i.e., the transitional period, signal T fluctuates to repeat an acceleration mode "e" and a deceleration mode "d" in response to an overshoot and an undershoot of the r.p.m. of the motor. FIG. 3C shows a timing chart of phase-synchronization detecting circuit 80, i.e., the timing chart of signal ST supplied from driving state detector 300. Signal ST turns into Low when the phases of frequency signal Fsp and reference frequency signal Fref are synchronized, namely, when the motor enters into the regular rotating state. Signal ST stays at Low during the regular rotating state, and stays at High in the other states.

FIG. 4A–FIG. 4C illustrate the operation of the first embodiment, and show the timing charts of respective signals. FIG. 4A shows an operation in which signal FCH supplied from PWM frequency switch 60 is changed by signal ST output from phase-synchronization detecting circuit 80. In FIG. 4A, switch 60 changes a frequency of signal FCH, which is to be a carrier signal of PWM driving, in responses to signal ST. In other words, switch 60 selects a lower frequency when signal ST stays at High, and selects a higher frequency when signal ST stays at Low, and outputs signal FCH.

Next, an operation when signal ST stays at High, namely, an operation from the start-up period to the transitional period before the regular rotating state, is demonstrated. FIG. 4B shows timing charts of respective signals while signal ST stays at High. Signals Aa–Cb are output from conduction switch 30, and those signals show the changes of the conduction states of driving coils 1–3, i.e., switch-timings of commutation. While signal ST stays at High, signal FCH supplied from PWM frequency switch 60 selects a lower frequency. Pulse-width modulator 70 outputs signal PWM 1, having a pulse width (duty) in response to torque instructing signal T and based on a lower carrier frequency in response to signal FCH, to PWM controller 40. Respective gates of the first group of driving transistors, forming first driver 200, receive signals Aa, Ba and Ca supplied from conduction switch 30 as well as similar signals P1u, P2u and P3u via PWM controller 40 of which structure is shown in FIG. 2.

Assume that transistor 7, one of the second group of driving transistors forming second driver 210, has gate-signal P1d, so that AND of signal Ab and signal PWM 1 is output from AND gate 41 shown in FIG. 2. In the same way, transistor 8 has gate signal P2d, then AND of signal Bb and signal PWM 1 is output. Transistor 9 has gate signal P3d, then AND of signal Cb and signal PWM 1 is output. Each one of signals P1u–P3d thus obtained controls ON/OFF of respective transistors 4–9.

Next, an operation in the regular rotating state, i.e., while signal ST stays at Low, is demonstrated hereinafter. FIG. 4C shows timing charts of the respective signals while signal ST stays at Low, where signal FCH supplied from PWM frequency switch 60 selects a higher frequency. Pulse-width modulator 70 outputs signal PWM 1, having a pulse width (duty) in response to torque instructing signal T and based on a higher carrier frequency in response to signal FCH, to PWM controller 40. Signals P1u–P3d supplied from PWM controller 40 structured as shown in FIG. 2 can be obtained in a similar way to the case where signal ST stays at High, and ON/OFF of transistors 4–9 are controlled at a higher frequency.

FIG. 5A and FIG. 5B illustrate waveforms of driving-coil currents in the first embodiment. FIG. 5A shows the waveform while signal ST stays at High, and FIG. 5B shows the waveform while signal ST stays at Low. As both the drawings tell, ripples A of the current passing through the driving coils in the case of a lower carrier frequency are greater than ripples B in the case of a higher carrier frequency. The higher carrier frequency produces a smaller change component of the torque, so that a proportionately higher resolving power can be expected and a more accurate control over the motor rotation is achievable.

The foregoing discussion proves that the motor driving apparatus of the first embodiment needs to feed a great amount of current to the driving transistors, which generate a large amount of heat in the start-up period of the motor. Thus the motor is driven at a low PWM carrier frequency in order to reduce the power loss. On the other hand, when the motor enters into the regular rotating state, where an accurate control over the rotation is needed, the motor is driven at a high PWM carrier frequency so that small ripples in the current can be expected. As a result, the motor can be driven by the control with high resolving power.

In the foregoing structure of this first embodiment, phase-synchronization detecting circuit 80 is used as driving state detector 300; however various forms can be available for the driving-state detector. For instance, if the start-up period of the motor is typically constant, a timer circuit can set signal ST at High for a certain period after a start-instruction signal is output. Another structure is this: The frequency comparing circuit is used, and signal Fsp and signal Frep are fed into the frequency comparing circuit, and when both the signals agree with each other, signal ST as an output signal is changed. Other structures, as far as they can distinguish the regular rotating state of the motor, can be also used as driving-state detector 300 without any specific structural requirements, and they can produce a similar advantage to that of the present invention.

A plurality of the driving elements included in the first and second drivers can be field-effect transistors (FET), insulated gate bipolar transistors (IGBT) or bipolar transistors.

Exemplary Embodiment 2

Figure 6:
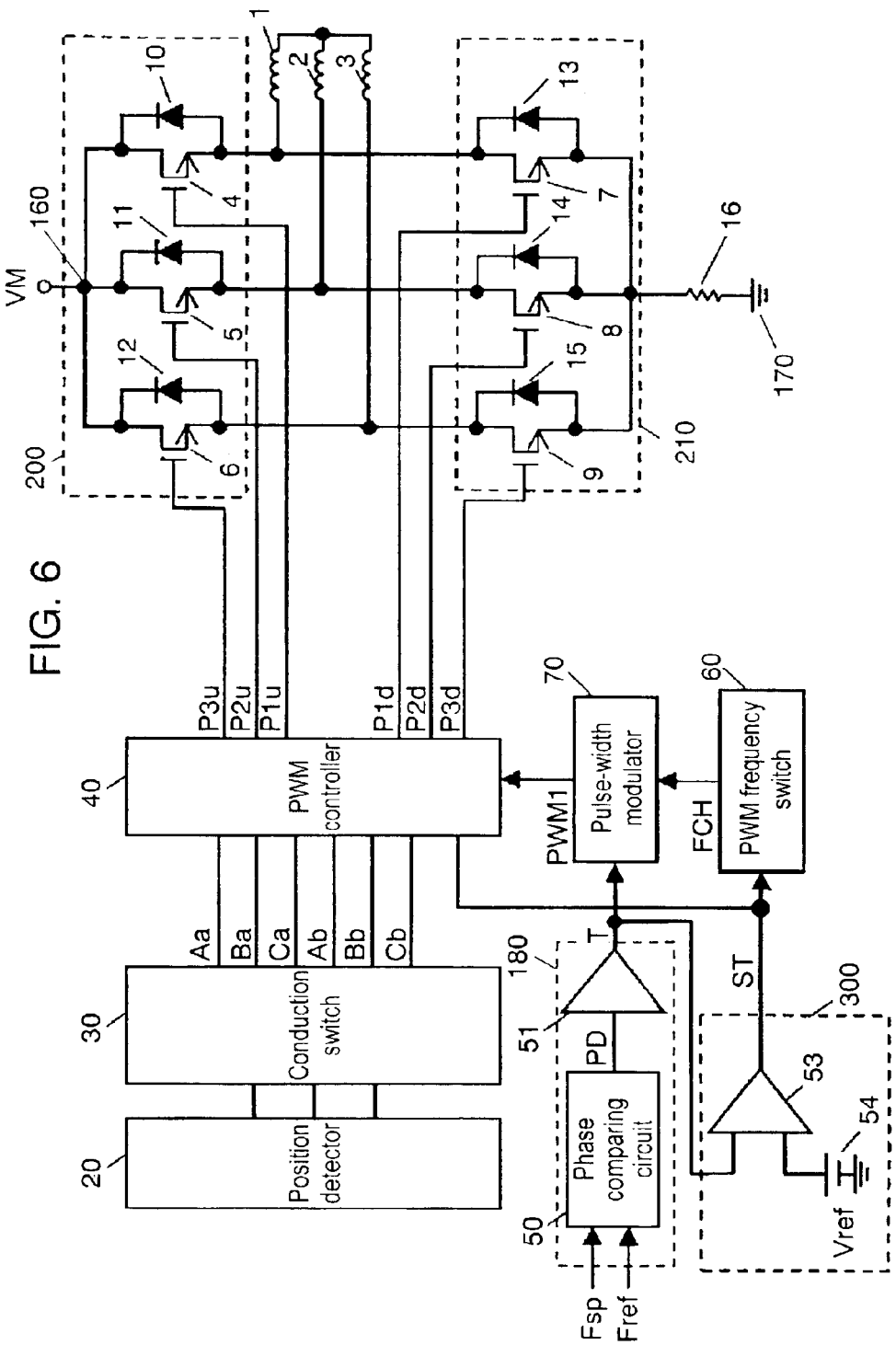
FIG. 6 shows a circuit diagram of a motor driving apparatus in accordance with a second exemplary embodiment of the present invention.
Figure 7:
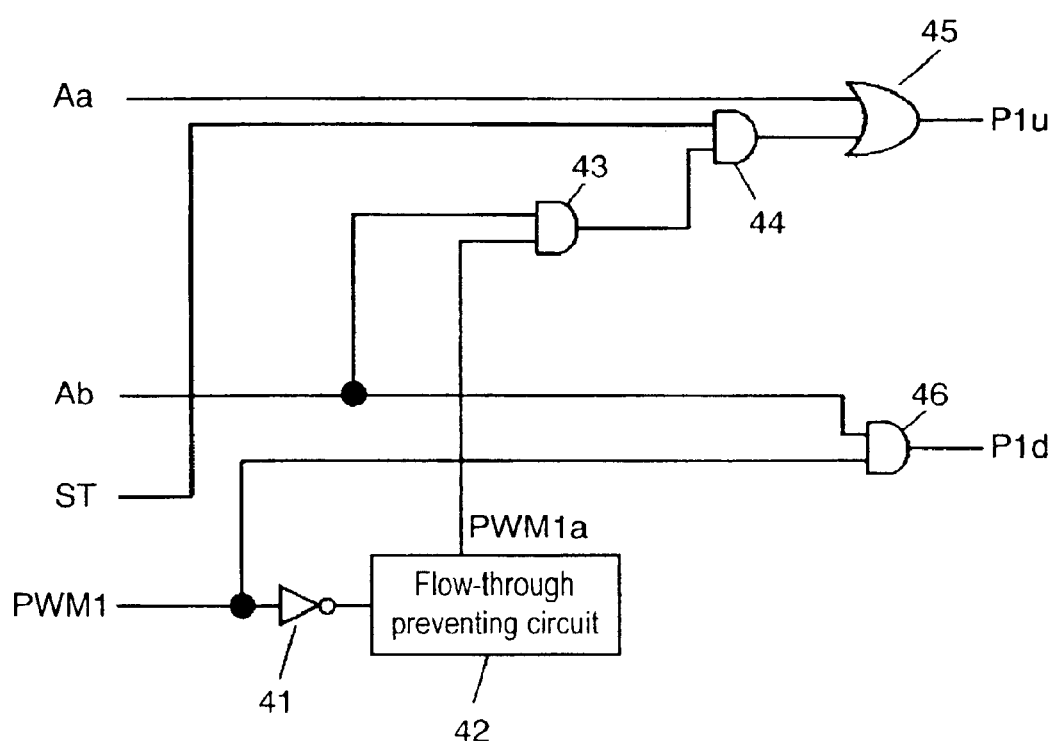
FIG. 7 shows a circuit diagram of a PWM controller in the motor driving apparatus shown in FIG. 6.
Figure 8A:
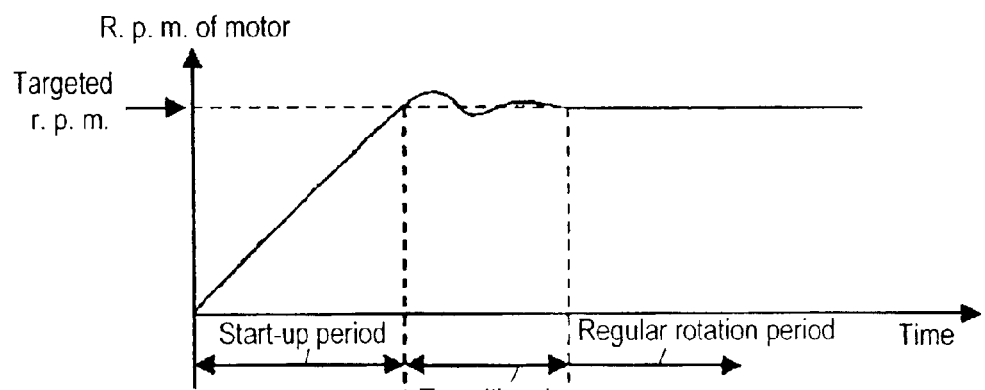
FIG. 8A through FIG. 8C illustrate an operation of the motor driving apparatus shown in FIG. 6.
Figure 8B:
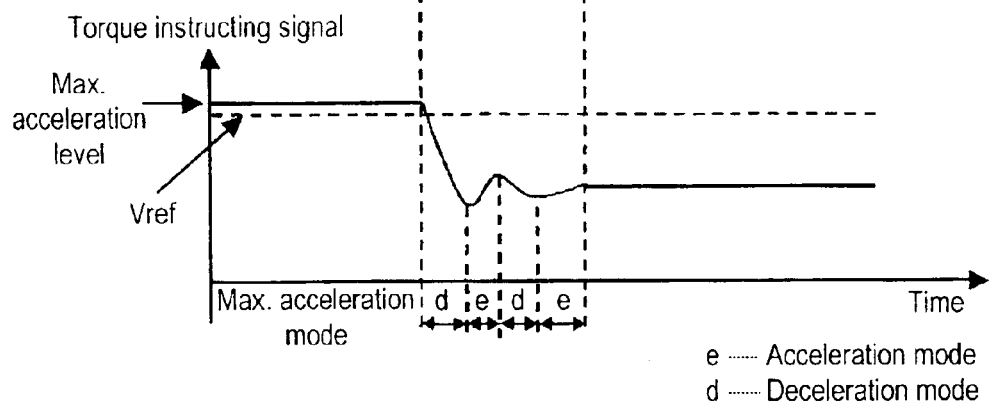
Figure 8C:
Figure 9A:
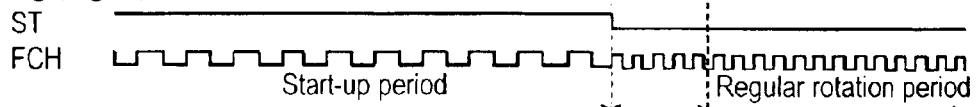
FIG. 9A through FIG. 9C show timing charts of signals of the motor driving apparatus shown in FIG. 6.
Figure 9B:
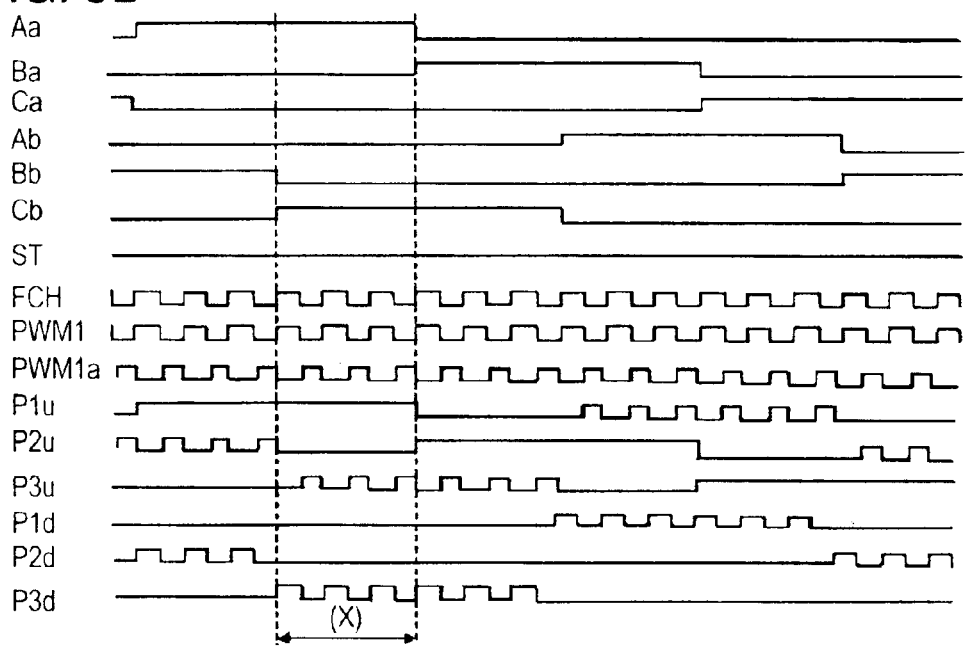
Figure 9C:
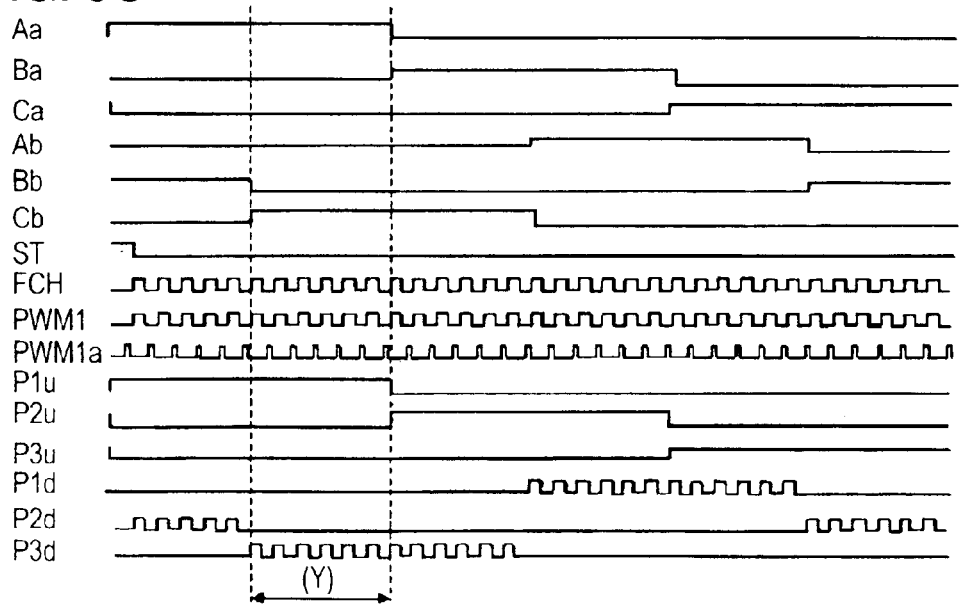
Figure 10A:
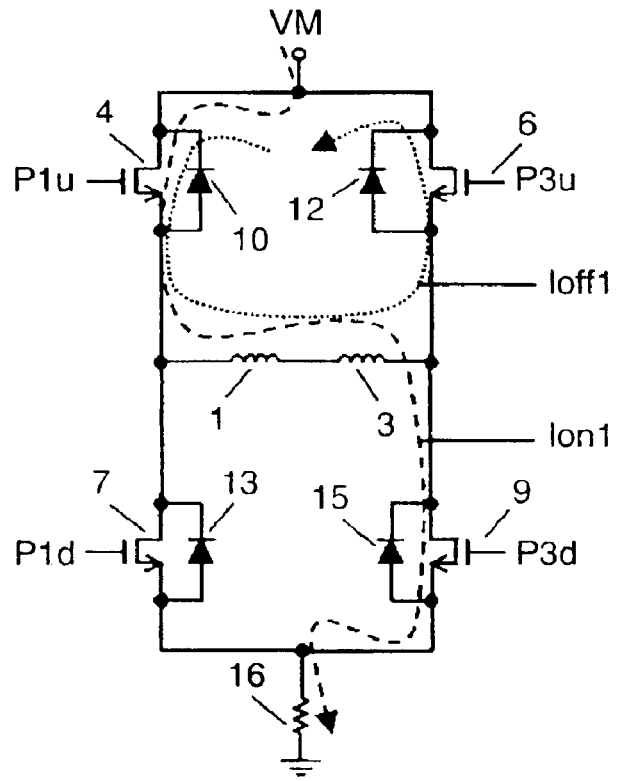
FIG. 10A and FIG. 10B are schematic drawings showing current paths of driving-coil currents of the motor driven by the driving apparatus shown in FIG. 6.
Figure 10B:
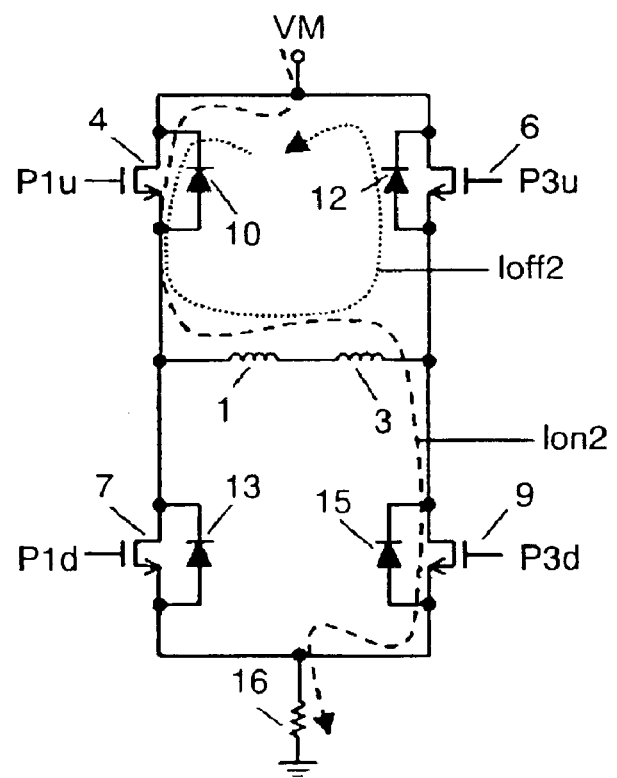

FIG. 6 shows a circuit diagram of a motor driving apparatus in accordance with the second exemplary embodiment of the present invention. FIG. 7 shows a circuit diagram of a PWM controller in the motor driving apparatus. FIG. 8A through FIG. 8C illustrate an operation of the motor driving apparatus. FIG. 9A through FIG. 9C show timing charts of signals of the motor driving apparatus. FIG. 10A and FIG. 10B are schematic drawings showing current paths of driving-coil currents of the motor driven by the driving apparatus.

In this second embodiment, similar elements to those in the first embodiment have the same reference marks, and the descriptions thereof are omitted here. In FIG. 6, the second embodiment differs from the first one in the following points: A first input terminal of comparator 53 receives an output from error-amplifying circuit 51 of torque instructor 180. A second input terminal of comparator 53 is coupled to a second terminal of reference power supply 54 of which first terminal is grounded. In other words, reference voltage Vref is fed into the second input terminal of comparator 53, which outputs signal ST to PWM frequency switch 60 and PWM controller 40 respectively. Comparator 53 and reference power supply 54 form driving-state detector 300 of the present invention. PWM controller 40 works in two modes, i.e., a single side PWM mode and a synchronous rectification PWM mode. A specific structure of PWM controller 40 can be, e.g., the one shown in FIG. 7.

FIG. 7 illustrates signals P1u and P1d fed to respective gates of driving transistors 4 and 7 coupled to driving coil 1 shown in FIG. 6. The gate signals of other driving transistors coupled to driving coils 2 and 3 can be drawn in a similar way to FIG. 7, so that those drawings are omitted here.

In FIG. 7, signals Aa and Ab are supplied from conduction switch 30, and signal Aa is fed into OR gate 45, signal Ab is fed into AND gates 43, 46. Signal ST is supplied from comparator 53, and fed into AND gate 44. Signal PWM1 is supplied from pulse-width modulator 70, and fed into AND gate 46 as well as flow-through preventing circuit 42 via inverter 41. An output from flow-through preventing circuit 42 is fed into AND gate 43, of which output is fed into AND gate 44. An output from AND gate 44 is fed into OR gate 45. Outputs from OR gate 45, AND gate 46 respectively form outputs P1u, P1d of PWM controller 40. Outputs P2u, P2d, P3u and P3d from PWM controller 40 can be obtained using similar circuits to that of the foregoing discussion.

An operation of the driving apparatus structured above is demonstrated hereinafter. FIG. 8A and FIG. 8B illustrates an operation of driving-state detector 300 in accordance with the second embodiment, and shows a relation between the tracking of r.p.m. of the motor from the start-up state to the regular rotating state and signal ST supplied from detector 300.

FIGS. 8A and 8B are similar to FIGS. 3A and 3B of the first embodiment, and the descriptions thereof are omitted here. FIG. 8C shows a timing chart of signal ST output from driving-state detector 300. Reference voltage Vref set at a lower level than the max. acceleration level of the torque instructing signal by a given level makes signal ST stay at High only in the start-up period of the motor.

FIG. 9A through FIG. 9C illustrate the operation of the motor driving apparatus in accordance with the second embodiment, and show timing-charts of respective signals. FIG. 9A shows that signal FCH supplied from PWM frequency switch 60 is switched by signal ST, which stays at High only in the start-up state of the motor, and turns to Low in the transitional period, where the acceleration mode and the deceleration mode are mixed, as well as in the regular rotating period. PWM frequency switch 60 switches a frequency of signal FCH, which is to be a carrier signal of the PWM driving, in response to signal ST. Switch 60 selects a lower frequency when signal ST stays at High, selects a higher frequency when signal ST stays at Low, and outputs signal FCH to pulse-width modulator 70.

Next, an operation while signal ST stays at High, namely, in the start-up period of the motor, is demonstrated. FIG. 9B shows timing-charts of the respective signals while signal ST stays at High. To PWM controller 40, pulse-width modulator 70 outputs signal PWM1 having a pulse width in response to torque instructing signal T with a carrier frequency corresponding to signal FCH supplied from PWM frequency switch 60. PWM controller 40 outputs signal P1d, which is AND signal of signal PWM 1 and signal Ab supplied from conduction switch 30, to the gate of driving transistor 7.

Signal PWM1 is inverted by inverter 41 shown in FIG. 7 and fed into AND gate 43 as signal PWM1a via flow-through preventing circuit 42. Signal Ab is also fed into AND gate 43, of which output forms AND together with signal ST at AND gate 44. Since signal ST stays at High, an output from AND gate 43 passes through AND gate 44 as it is and fed into OR gate 45. Signal Aa supplied from conduction switch 30 is also fed into OR gate 45, which then outputs signal P1u as an output of PWM controller 40 to the gate of driving transistor 4. Signals P1u and P1d shown in FIG. 9B are thus obtained. In the same way, signals P2u, P2d, P3u and P3d are obtainable. Each one of six signals P1u–P3d thus obtained controls ON/OFF of respective driving transistors 4–9. Flow-through preventing circuit 42 adjusts a pulse width so that each one pair of the respective pairs of transistors cannot be turned on simultaneously. The pairs of transistors are transistors 4, 5, and 6 of the first driver forming the upper arm vs. transistors 7, 8 and 9 of the second driver forming the lower arm. For instance transistor 4 and its counter part transistor 7 form a pair.

FIG. 10A illustrates the operation while signal ST stays at High, and shows paths of currents passing through driving coils 1 and 3 during period (X) shown in FIG. 9. Period (X) indicates a timing at which a phase of the current flowing from power supply VM through coils 1 and 3 in this order is switched. In this period transistor 4 stays always at ON state, on the other hand, transistor 6 and its counterpart transistor 9 repeat ON/OFF based on the synchronous rectification PWM driving.

The synchronous rectification PWM driving is the flowing method: In FIG. 10A, during a PWM off period, namely, one of the driving transistors (e.g. transistor 9) is in PWM off period, its counterpart transistor 6 is turned on, so that the energy stored in coils 1 and 3 are regenerated via transistor 6 of which on-resistance is smaller than that of flywheel diode 12. As a result, the power loss can be reduced.

In FIG. 10A, transistor 4 stays always at ON state, and transistor 9 is PWM-driven, so that it repeats ON/OFF. First, when transistor 9 is turned ON, its counterpart transistor 6 is turned OFF, so that current Ion1 passes through coils 1 and 3 as shown in FIG. 10A. Next, when transistor 9 is in OFF state, transistor 6 is in ON state, and current Ioff1 regenerated by the energy of coils 1, 3 passes through transistor 6.

As such, when transistor 9 stays in OFF state, the current bypasses transistor 6 having a rather small voltage drop, instead of the current being regenerated via flywheel diode 12 having a greater voltage drop, thereby reducing the power loss. At this time a lower PWM frequency is selected by PWM frequency switch 60, therefore, the synchronous rectification PWM driving can prevent the flow-through current with ease. Switching loss produced in repeating ON/OFF of the transistors can be also reduced because the switching frequency is low, so that the number of switching actions (ON/OFF) becomes proportionately less.

Next, an operation while signal ST stays at Low, namely, while the motor is in the transitional period and in the regular rotating period, is demonstrated. FIG. 9C shows timing charts of the respective signals while signal ST stays at Low. In this case, an output from AND gate 44 shown in FIG. 7 stays always at Low. As a result, signal Aa passes through OR gate 45 as it is, and is supplied from OR gate 45 as signal P1u.

FIG. 10B illustrates the operation while signal ST stays at Low, and shows paths of the currents passing through coils 1, 3 during period (Y) shown in FIG. 9C. Period (Y) indicates a timing at which a phase of the current flowing from power supply VM through coils 1 and 3 in this order is switched. The operation is basically similar to that of signal ST staying at High, and works in the single side PWM driving mode, where transistor 6 is suppressed to perform ON/OFF (transistor 6 stays always in OFF state during period (Y)) by the ON/OFF of transistor 9. Therefore, while transistor 9 is in OFF state of PWM driving, regenerative current Ioff2 passes via diode 12 as shown in FIG. 10B.

The foregoing structure allows switching a chopping frequency (carrier frequency) of PWM and the driving mode in response to signal ST. In other words, in the start-up period, the synchronous rectification PWM driving at a lower PWM frequency can realize the driving with the least power loss including the switching loss produced at every ON/OFF action of the driving transistors. On the other hand in the regular rotating period, the single side PWM mode at a high enough PWM frequency realizes the driving with accuracy. The switching to/from the synchronous rectification PWM mode from/to the single side PWM mode is prepared such that the synchronous rectification PWM mode is used only at the max. acceleration in the start-up period. As a result, the negative current flowing to the power supply can be prevented. The negative current has been a problem of the synchronous rectification PWM mode, due to an instruction of reducing torque caused by a change of the load in the transitional period or the regular rotating period.

In the structure in accordance with the second embodiment, comparator 53 working as driving-state detector 300 can detect the start-up period of the motor in response to torque instruction signal T. As this has been described in the first embodiment, various forms can be available for the driving-state detector. For instance, if the start-up time of the motor is typically constant, a timer circuit can set signal ST at High for a certain period after a start-instruction signal is output. Another structure is this: The frequency comparing circuit is used, and signal Fsp and signal Frep are fed into the frequency comparing circuit, and when both the signals agree with each other, signal ST as an output signal is changed. Other structures, as far as they can distinguish the regular rotating state of the motor, can be also used as the driving-state detector without any specific structural requirements and they can produce a similar advantage to that of the present invention.

In both the first and second embodiments, PWM frequency switch 60 can be equipped with a plurality of oscillators, and the plural frequency-signals can be switched over, or a single oscillating signal is divided into plural frequency-signals to be switched over. In particular, use of the single oscillating signal to be divided into plural frequency-signals can simplify an oscillating circuit and reduce the cost.

Exemplary Embodiment 3

Figure 11:
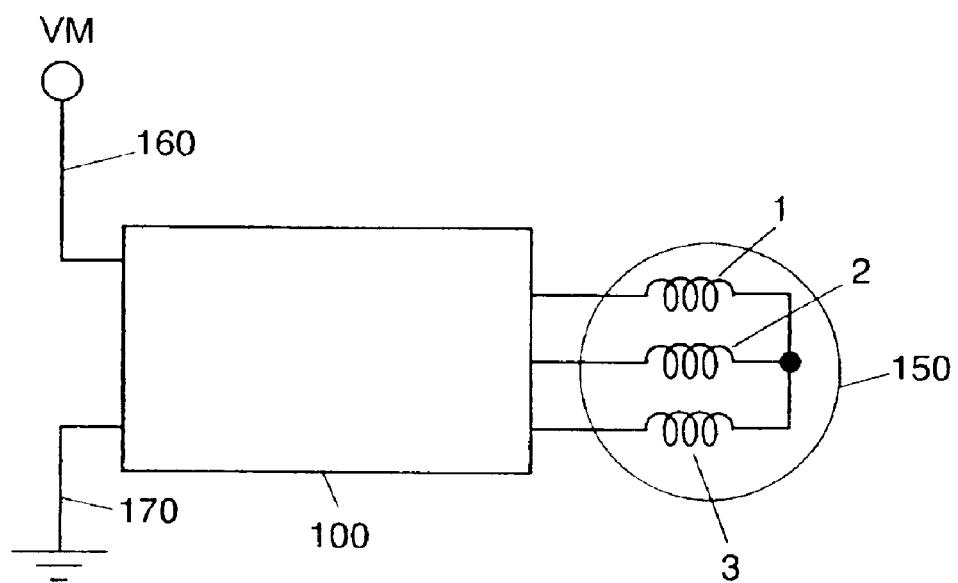
FIG. 11 shows a motor and its driving apparatus in accordance with a third exemplary embodiment of the present invention.
Figure 12:
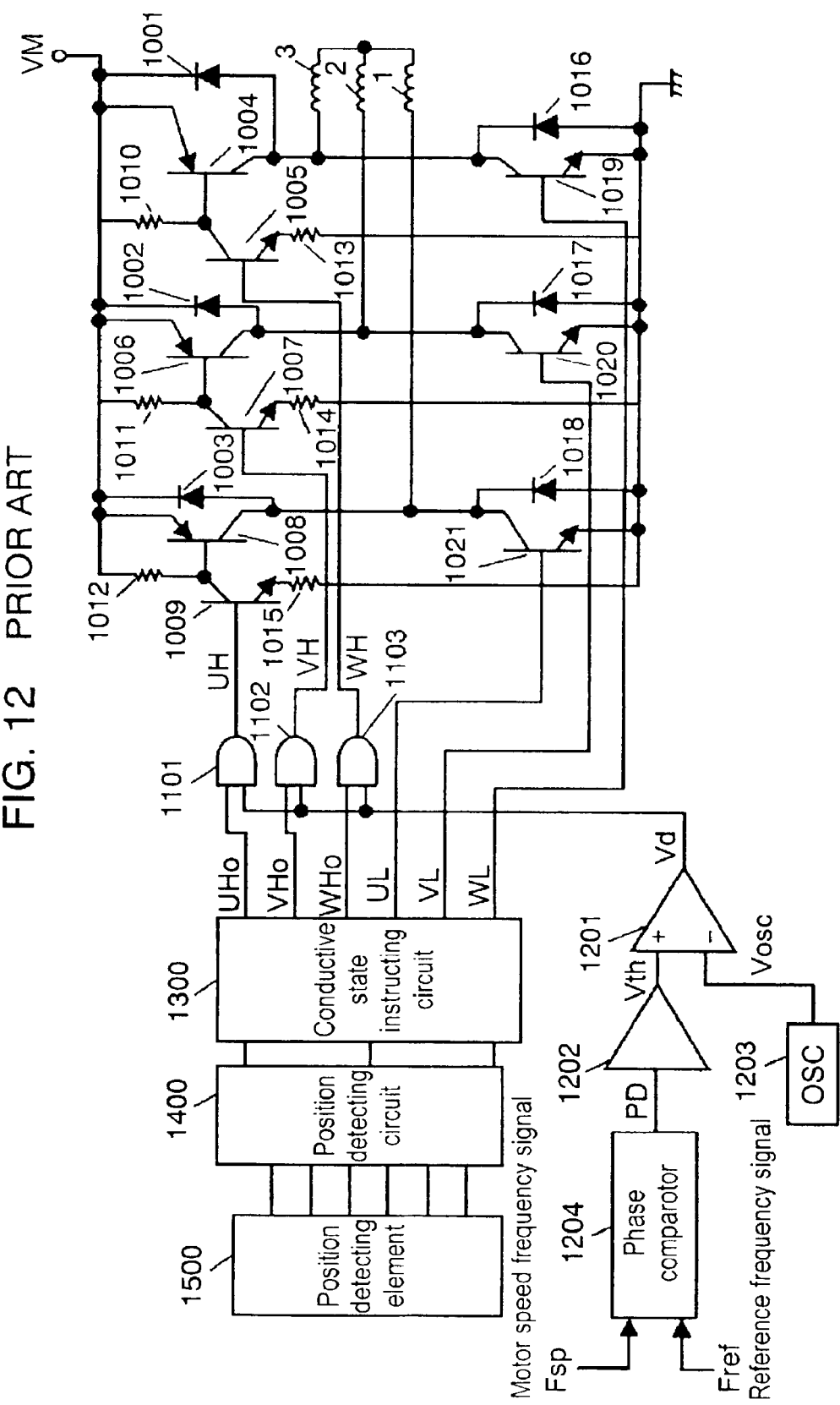
FIG. 12 shows a circuit diagram of a conventional motor driving apparatus.
Figure 13:
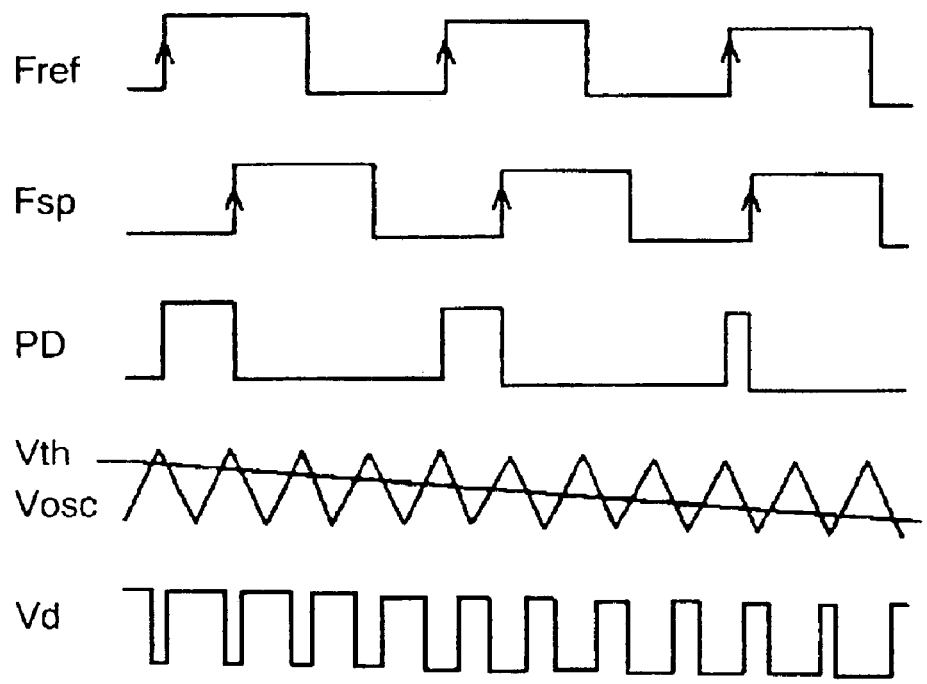
FIG. 13 illustrates an operation of the motor driving apparatus shown in FIG. 12.

FIG. 11 shows a motor and its driving apparatus in accordance with the third exemplary embodiment of the present invention. In FIG. 11, driving coils 1–3 of motor 150 are coupled to driving apparatus 100, which is connected between first power-supply line 160 connected to power-supply terminal VM and second power-supply line 170 connected to the grounding.

Driving apparatus 100 uses the driving apparatus described in the first or the second embodiment, so that the motor in accordance with the third embodiment can utilize the advantages produced in the first or the second embodiment.

As the first through the third embodiments tell, the present invention provides a motor driving apparatus that can reduce the power loss caused by PWM chopping (switching) during the acceleration of a motor, and drive the motor accurately at a high enough PWM frequency during the regular rotating period. The present invention also provides a motor using the foregoing driving apparatus.

A PWM controller is equipped with a plurality of driving modes including a synchronous rectification PWM mode which puts both the first and second drivers into PWM operation, and a single side PWM mode which puts either one of the first driver or the second driver into the PWM operation. The controller works in the synchronous rectification PWM mode only during the acceleration of the motor, and the mode is switched to the single side PWM mode during the regular rotating period of the motor. This structure allows the power loss to be further reduced with the chopping by the driving elements at a lower PWM frequency as well as with the synchronous rectification PWM mode in accelerating the motor. On the other hand, while the motor spins at a regular r.p.m., the single side PWM mode at a high enough PWM frequency achieves accurate spinning of the motor. At a timing when a braking current passes through the driving coils due to a change in the r.p.m. or in the load of the motor, the synchronous rectification PWM mode should not be used, so that the negative current is prevented. As a result, various inconveniences due to this negative current can be avoided.

What is claimed is:

1. A motor driving apparatus comprising:
   (a) a first driver formed of a plurality of driving elements which are coupled to both a driving coil of a motor and a first power-supply line;
   (b) a second driver formed of a plurality of driving elements which are coupled to both the driving coil of the motor and a second power-supply line;
   (c) a position detector for detecting a positional relation between a rotor magnet of the motor and the driving coil;
   (d) a conduction switch for outputting a conduction switching signal to the driving coil based on a detection signal supplied from the position detector;
   (e) a torque instructor for outputting a torque instructing signal for regulating torque generated by the motor;
   (f) a pulse-width modulator for outputting a frequency signal having a duty of a pulse width in response to the torque instructing signal;
   (g) a PWM controller for controlling ON/OFF of the plurality of driving elements included in the first driver and the second driver in response to an output signal from the conduction switch and an output signal from the pulse-width modulator;
   (h) a driving-state detector for detecting at least one of an acceleration mode, a deceleration mode, and a regular rotation mode of the motor being driven; and
   (i) a PWM frequency switch for switching a carrier frequency of the pulse-width modulator based on an output from the driving-state detector,
   wherein the carrier frequency is set at a lower level in a start-up period of the motor than in a regular rotation period.

2. The motor driving apparatus of claim 1, wherein the PWM controller includes a synchronous rectification PWM mode that puts both the first and the second drivers into PWM operation, and a single side PWM mode that puts one of the first driver and the second driver into the PWM operation, and the motor is driven in the synchronous rectification PWM mode in the start-up period.

3. The motor driving apparatus of claim 2, wherein the driving-state detector detects a maximum acceleration state of the torque instructing signal.

4. The motor driving apparatus of claim 1, wherein the driving-state detector detects a maximum acceleration state of the torque instructing signal.

5. A driving apparatus according to claim 1, wherein said apparatus is coupled to a motor for driving said motor.

6. The motor driving apparatus of claim 5, wherein the PWM controller includes a synchronous rectification PWM mode that puts both the first and the second drivers into PWM operation, and a single side PWM mode that puts one of the first driver and the second driver into the PWM operation, and the motor is driven in the synchronous rectification PWM mode in the start-up period.

7. The motor driving apparatus of claim 6, wherein the driving-state detector detects a maximum acceleration state of the torque instructing signal.

8. The motor driving apparatus of claim 5, wherein the driving-state detector detects a maximum acceleration state of the torque instructing signal.

* * * * *

UNITED STATES PATENT AND TRADEMARK OFFICE
CERTIFICATE OF CORRECTION

PATENT NO. : 6,873,125 B2
DATED : March 29, 2005
INVENTOR(S) : Toshiaki Seima et al.

It is certified that error appears in the above-identified patent and that said Letters Patent is hereby corrected as shown below:

<u>Column 12,</u>
Line 60, between "A" and "driving", insert -- motor --.
Lines 60-61, between "said" and "apparatus", insert -- motor driving --.

Signed and Sealed this

Twentieth Day of December, 2005

JON W. DUDAS
*Director of the United States Patent and Trademark Office*